United States Patent [19]

Ehsani et al.

[11] Patent Number: 5,375,144

[45] Date of Patent: Dec. 20, 1994

[54] BROAD-BAND MOBILE RADIO LINK FOR HIGH-VOLUME TRANSMISSION IN AN ENVIRONMENT WITH MULTIPLE REFLECTIONS

[75] Inventors: Shahrokh Ehsani; Giuseppe Quagliariello, both of Rome, Italy

[73] Assignee: Vitroselenia S.p.A., Rome, Italy

[21] Appl. No.: 823,534

[22] Filed: Jan. 21, 1992

[51] Int. Cl.⁵ .................. H04K 1/10; H04L 27/28; H04L 27/18
[52] U.S. Cl. ............................ 375/38; 375/59; 375/67; 375/83; 375/96; 375/52; 380/10; 370/121
[58] Field of Search ............ 375/100, 40, 97, 98, 375/52, 67, 83, 38, 59, 96, 1; 455/63, 52.3, 255, 234.1, 232, 245.2, 39; 329/304, 350; 332/100; 380/9, 10; 370/20, 121

[56] References Cited

U.S. PATENT DOCUMENTS 5,031,193  7/1991  Atkinson et al. ............ 375/100 X

*Primary Examiner*—Curtis Kuntz
*Assistant Examiner*—Tesfaldet Bocure
*Attorney, Agent, or Firm*—Herbert Dubno

[57] ABSTRACT

Digital radio link capable to solve the problem of high-volume data transmission in environments with multiple reflections, such as urban areas, inside buildings, etc. The said radio link can be used as a radiotelephone network or a local network for connecting computers. Essentially, it consists of a standard transmitter and a receiver consisting in turn of an antenna, a circulator, a pass band filter, a LNA amplifier, a group of frequency converters, an AGC amplifier, a buffer, a bank of matched filters, an amplifier compensating the filter losses, a quadratic detector, a path combiner, a video amplifier, a matched threshold generator, a bank of comparators, a decision-making block (essentially consisting of a multiplexer), a time-base regenerator and, an alarm.

4 Claims, 3 Drawing Sheets

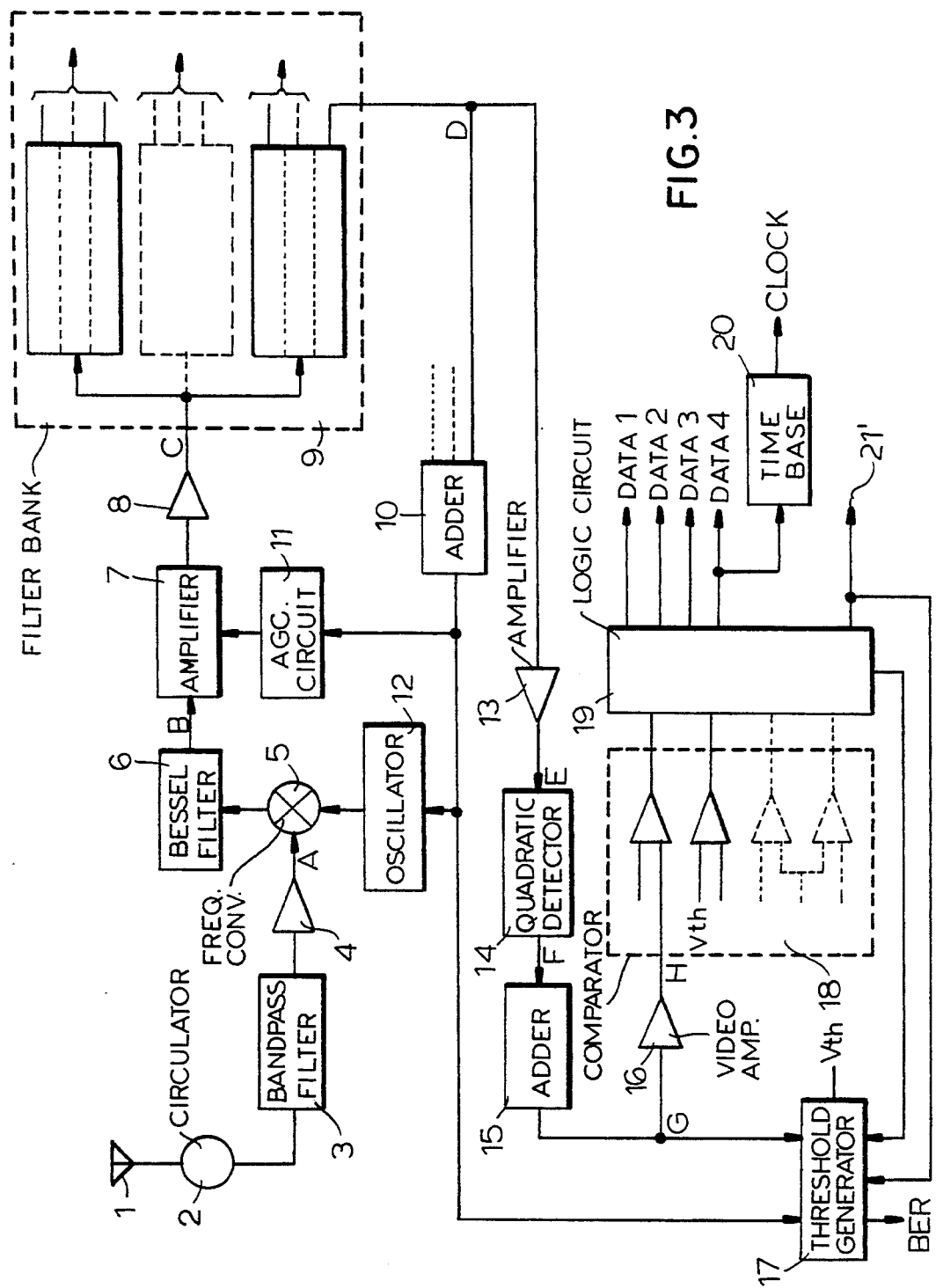

BROAD-BAND MOBILE RADIO LINK FOR HIGH-VOLUME TRANSMISSION IN AN ENVIRONMENT WITH MULTIPLE REFLECTIONS

FIELD OF THE INVENTION

Our present invention relates to a broad-band mobile radio link for high-volume transmission in an environment with multiple reflections.

SUMMARY OF THE INVENTION

The present invention provides a radio link capable of solving the problem of high-volume data transmission in an environment with multiple reflections, such as urban areas, inside buildings, etc. Due to its original construction this radio link can perform multiple functions such as use as a radio telephone, as a local network for the connection of computer networks, and as a means to transmit data beyond 1 Mbit/sec per IF channel at 100 mw of radiated power with a BER better than $10^{-7}$. This invention eliminates the drawbacks which impair radio communication between self-propelled carriers in an urban environment and inside buildings. These drawbacks can be summarized as follows:

1. the rapid variation of power by tens of dB in spaces spaced from each other by a fraction of a wavelength; and
2. the multiple echoes which deform the shape of the transmitted wave.

The first drawback, which causes modulation during motion which leads to a decrease in the signal/noise ratio, is eliminated by the use in the system of the invention of an antenna with multiple elements (see the concurrently filed commonly owned copending application Ser. No. 07/823,535).

The second drawback is overcome by using a receiver with an echo detection sweep which allows resolution of the echoes which are spaced from each other by 1/255 of the length of 1 bit, resulting in the fact that the multiple echoes, instead of downgrading, contribute with their shares of information to the signal demodulation. In the radio link of the invention, two types of orthogonality are used on the same radio frequency. The first orthogonality type is due to the pseudo-aleatory codes which allow multiple access and the other orthogonality is obtained by a decoupling in medium frequency equal to 20 log 2 f.T (wherein T is the duration of 1 bit), and this allows a more efficient use of the band.

The use of this band in this system, as anywhere else, is a consequence of Shannon's theorem.

BRIEF DESCRIPTION OF THE DRAWING

The above and other objects, features and advantages of our invention will become more readily apparent from the following description, reference being made to the accompanying highly diagrammatic drawing in which:

FIG. 3 is block diagram of the receiver system.

SPECIFIC DESCRIPTION

To each mobile radio, a certain number of pseudo aleatory codes with auto-optimal/least side-lobe energy characteristics is assigned. The intermediate frequency assigned identifies each of the mobile robots. The supervising station s.c. receives through the radio link all the data collected by the sensors arranged on the self-propelled carriers and gives the orders which have to be carried out by the mobile robots RM. The antenna system of the robot is not sensitive to rapid variations due to the RAYLEIGH, RICE and NAGAKAMI distributions, and by reciprocity, the antenna of the supervising station receives a power free of the quick variations due to motion.

If an improved use of the band is desired, one can resort to coding on transmission and decoding on reception.

Figure 1:
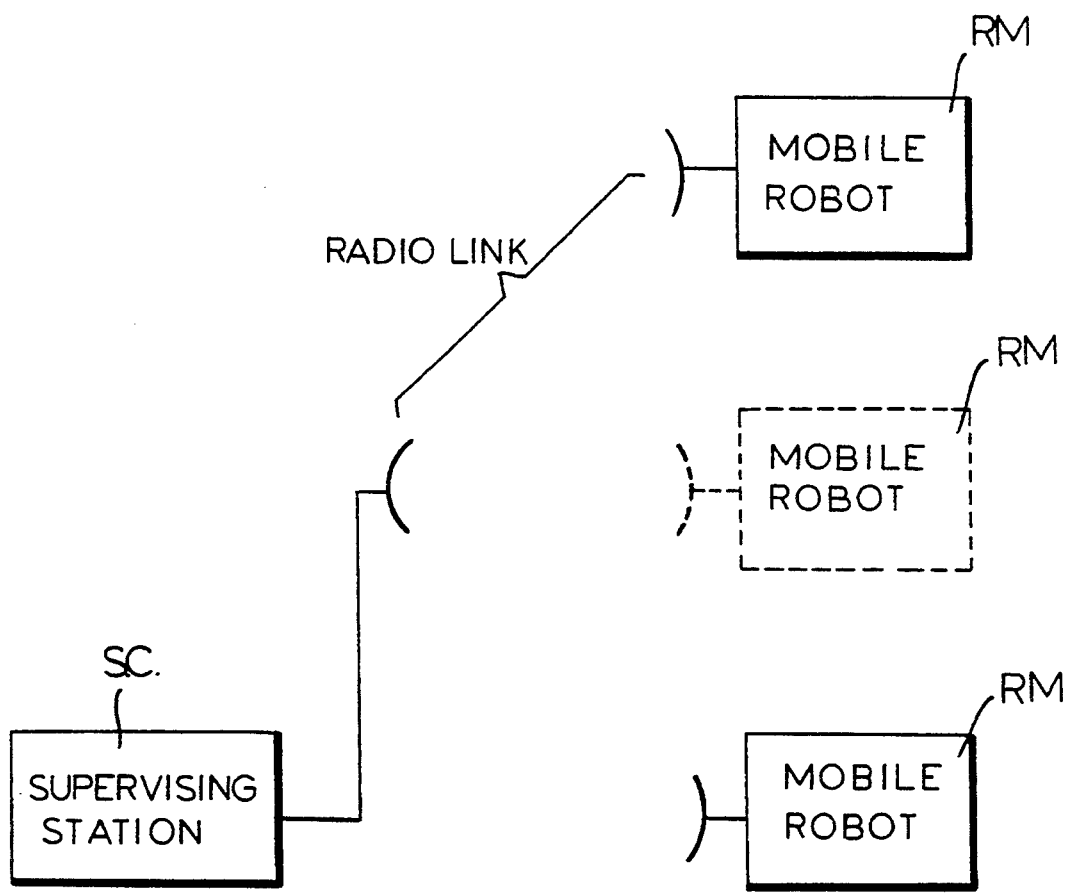
FIG. 1 is a block diagram of the communicating system using a supervising station and mobile robots.
Figure 2:
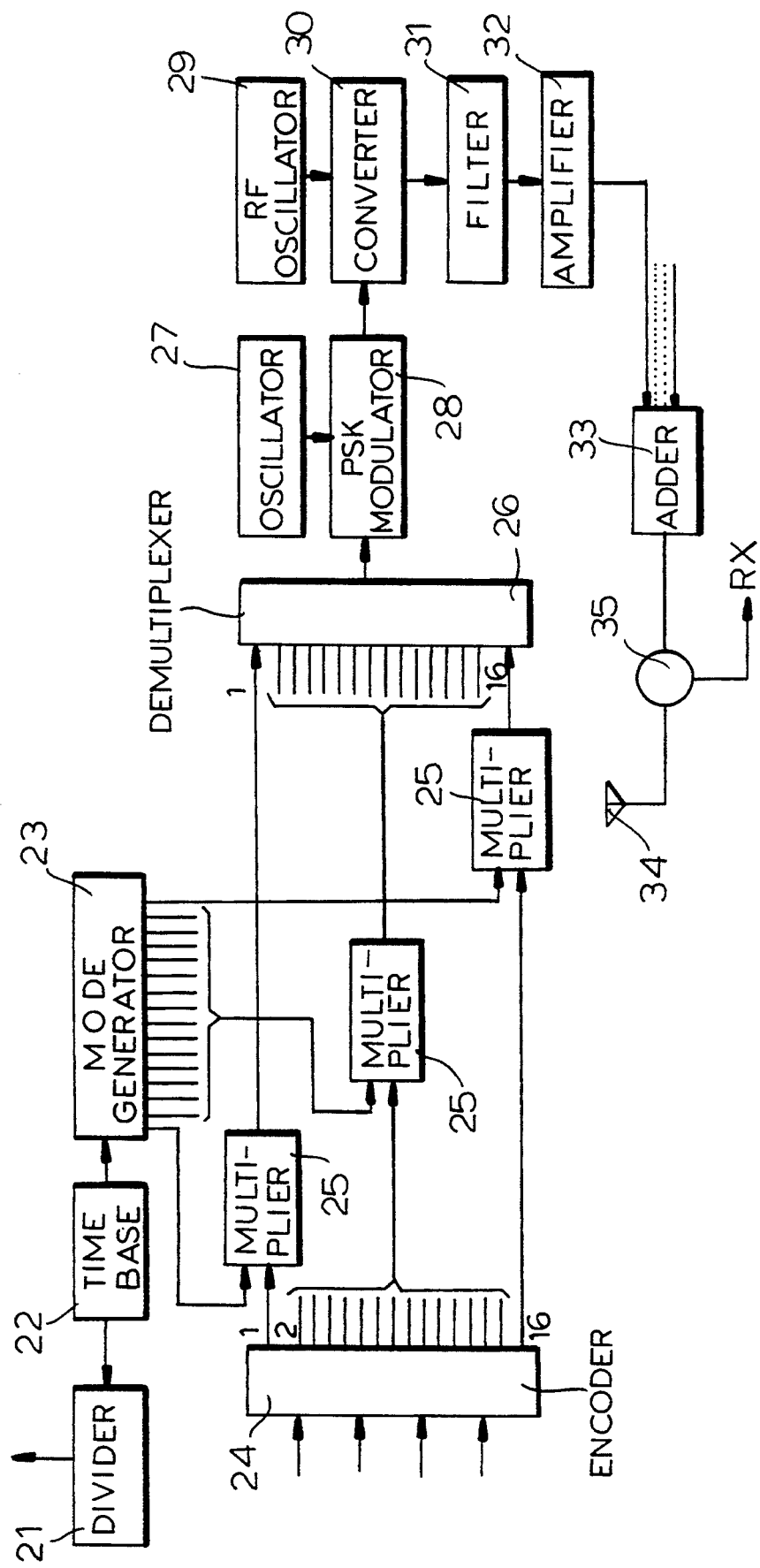
FIG. 2 is a block diagram of a radio link.

FIG. 2 shows, in block-diagram form, a radio link transmitter having a time-base generator 22 connected to a time-base divider/data synchronizer 21 and to a generator 23 of pseudo-aleatory codes for auto-optimal/lowest side lobe energy. The code generator 23 and an encoder 24 are connected to the multipliers 25 controlling the output of coding and code passage. These multipliers feed a signal combiner 26 providing an input to a PSK modulator 28. An oscillator (intermediate frequency I.F.) 27 in phase with the pseudo-aleatory coder psk (phase shift keying) supplies binary phase modulations from 0 to 180 degrees to the PSK modulator 28.

An RF oscillator 29 feeds a converter/frequency translator 30 having an input from the PSK modulator 28 and upstream of a filter 31 and a narrow-band amplifier 32. The latter outputs to a power adder 33 which ultimately feeds the circulator 35 and the antennas 34.

FIG. 3 is a block diagram of the broad-band receiver, with quadratic detector and double orthogonality which is most representative of the invention. The antenna 1 with multiple elements with spatial diversity insensitive to rapid power variations in space (see copending patent application Ser. No. 07/823,535 is connected to a circulator 2 and a Chebyshef bandpass filter 3 with 4 poles. The output of filter 3 is applied to an amplifier 4 with a gain of 40 dB and 1.8 dB noise level. The amplifier 4 outputs to a frequency converter 5 to which is connected a Bessel filter 6. The filter output is applied to an amplifier 7 with dynamic gain control of 30 dB at the output of which is an amplifier buffer 8 capable of furnishing $-10$ dBm to each filter matched to acoustic surface waves.

Banks 9 of matched filters, each bank consisting of 16 filters, are provided at the output of buffer 8. An adder 10 receives the output of the matched filter bank 9 and provides an input to an automatic gain control circuit 11, a local oscillator 12 and a threshold generator 17. A bank of amplifiers 13 to compensate the losses of the matched filters (approximately 35 dB) is connected to the filter bank 9 and to a quadratic low pass detector 14 feeding a combiner/adder bank 15 for returns, which essentially is an integrator with an integrating result over T where T is the duration of the bit.

The adder 15 outputs to a bank 16 of video amplifiers and to the threshold generators 17 with matched thresholds. A bank of comparators 18 receives the signals from the video amplifiers 16 and feeds a decision-making block 19 to which a time-base regenerator 20 and alarm circuitry 21 are connected.

The characteristics of the system include:
 in the antenna spatial diversity overcomes the drawbacks of rapid attenuation;

by not using the antipodal wave shaped the quadratic detector performs a filtering of the post-detection. This filtering weights the return with a weight proportional to its value;

the filters are matched to an acoustic surface wave which does not require any kind of synchronism; and the resulting system is robust, resistant to disturbances such as white noise over the entire width of the band and to non-Gaussian noises in narrow band.

The code generating function is $$(n) = h_1(n) h_2(n) = x^{12} + x^9 + x^7 + x^6 + x^5 + x^4 + x^2 + x^1$$

with the initial phases shown in a numerical table representing the initial conditions of the phase shifters with twelve cells. By applying this table the following outputs result

| | | | |
|---|---|---|---|
| 010 | 011 | 101 | 111 |
| 010 | 011 | 010 | 110 |
| 011 | 101 | 101 | 001 |
| 111 | 100 | 011 | 000 |
| 101 | 110 | 011 | 110 |
| 011 | 111 | 001 | 000 |
| 101 | 000 | 100 | 100 |
| 000 | 010 | 110 | 001 |
| 000 | 110 | 001 | 111 |
| 100 | 110 | 110 | 110 |
| 000 | 100 | 101 | 100 |
| 011 | 001 | 011 | 100 |
| 010 | 101 | 111 | 111 |
| 011 | 100 | 001 | 110 |
| 111 | 101 | 111 | 111 |
| 000 | 010 | 000 | 101 |

The receiver operates in the following manner:

The antenna 1 picks up the signal and conveys it by means of the circulator 2 to the bandpass filter 3 to the amplifier 4, and to the converter group 5, 6 12. The output is supplied to the amplifier 7 with AGC (automatic gain control) at 11. Given the receiver with multiple access, the signal from the AGC control is drawn from the output of the filter bank via adder 10. The buffer amplifier 8 distributes in an equivalent manner the transmitted signal which in the meantime has suffered a noticeable loss (more than 35 dB). This signal is nevertheless amplified by amplifier 13, regaining sufficient power to be detected by the quadratic detector 14. The multiple returns are this way combined in the combiner 15 and are sent to the video amplifier 16 and to the generator 17. The threshold level of generator 17 and the output of block 16 are compared in comparator 18. The output of comparator 18 goes to the decision-making block 19 (a block which is essentially a demultiplexer) from which the transmitted data emerges. From the data also the times are retrieved (by means of the time-base regenerator 20. The decision-making block is designed so that in case more than one comparator is activated, it triggers an alarm which raises the threshold; in addition the threshold generator supplies the BER (Bit Error Rate).

We claim:

1. A broad-band radio link for high-volume transmission of digital data in an environment with multiple reflections, said broad-band radio link comprising:

a transmitter comprising:

an encoder receiving data to be transmitted and having a multiplicity of output channels, a plurality of multipliers receiving respective inputs from output channels of said encoder;

a pseudorandom code generator for producing pseudorandom codes for auto-optimal/lowest side lobe energy having respective output channels connected to respective inputs of said multipliers a signal combiner receiving outputs from all of said multipliers and producing at an output thereof a binary modulation signal combining products of outputs from said channels of said encoder and said pseudorandom code generator, a PSK modulator connected to said output of said signal combiner and receiving said binary modulation signal therefrom, an intermediate frequency oscillator connected to said PSK modulator for supplying an intermediate frequency thereto for modulation with said binary modulation signal, said PSK modulator having an output, a radio frequency generator producing a radio frequency carrier, a converter connected to said radio frequency generator and to said output of said PSK modulator for producing an RF carrier modulated with an information-encoded and pseudorandom-coded modulation signal, and means including an antenna and connected to said converter for transmitting said RF carrier modulated with said information-encoded and pseudorandom-coded modulation signal; and a receiver responsive to the information carried by said RF carrier modulated with said information-encoded and pseudorandom-coded modulation signal, said receiver comprising:

a receiving antenna, a receiving circulator connected to said receiving antenna and extracting said RF carrier modulated with said information-encoded and pseudorandom-coded modulation signal therefrom, a bandpass filter connected to said receiving circulator for passing an information-encoded and pseudorandom-coded signal, an amplifier connected to said bandpass filter for amplifying said information-encoded and pseudorandom-coded signal, a frequency converter connected to said amplifier, provided with a frequency converter oscillator, and having a Bessel filter output;

an automatic gain control including a further amplifier receiving an output from said Bessel filter, connected to an automatic gain control circuit and having an adder for feeding the automatic gain control circuit, a buffer amplifier connected to said further amplifier for delivering a frequency converted gain-controlled information-encoded and pseudorandom-coded signal, filter means constituted of a plurality of banks of matched filters, each having a number of filters equal to the number of said channels of said encoder, connected to said buffer amplifier, outputs of said filters being connected to said adder, a filter-loss-compensating amplifier connected to said filter means, a quadratic detector connected to said filter-loss-compensating amplifier, an integrator capable of integrating over a bit duration connected to said quadratic detectors means for recovering information corresponding to inputs of said encoder and including video amplifiers connected with said integrator comparators connected to said video amplifiers, and a logic circuit in the form of a demultiplexer connected to said comparators for outputting respective information signals, a threshold generator connected to said integrator and to said adder for providing threshold levels for said comparators, and a time-base regenerator connected to said logic circuit for regenerating a time base of said information and provided with means for raising said threshold and issuing an alarm.

2. The broad-band radio link defined in claim 1 wherein said receiving antenna is a multiple-element antenna with spacial diversity.

3. The broad-band radio link defined in claim 1 wherein said matched filters are constructed and arranged to effect sampling of 255 parts of each bit.

4. The broad-band radio link defined in claim 1 wherein said transmitter is on a supervising station and said receiver is on one of a plurality of mobile robots in a building operated by said supervising station.

* * * * *